United States Patent
Buchmuller

(10) Patent No.: US 9,403,708 B2
(45) Date of Patent: Aug. 2, 2016

(54) APPARATUS AND METHOD FOR THERMAL HYDROLYSIS OF ORGANIC MATTER

(75) Inventor: Marianne Buchmuller, Uhlingen-Birkendorf (DE)

(73) Assignee: Eliquo Stulz GmbH, Grafenhausen (DE)

( * ) Notice: Subject to any disclaimer, the term of this patent is extended or adjusted under 35 U.S.C. 154(b) by 1086 days.

(21) Appl. No.: 13/259,710

(22) PCT Filed: Mar. 25, 2010

(86) PCT No.: PCT/EP2010/001886
§ 371 (c)(1),
(2), (4) Date: Nov. 23, 2011

(87) PCT Pub. No.: WO2010/108684
PCT Pub. Date: Sep. 30, 2010

(65) Prior Publication Data
US 2012/0061318 A1   Mar. 15, 2012

(30) Foreign Application Priority Data
Mar. 25, 2009   (DE) .......................... 10 2009 014 776

(51) Int. Cl.
| | |
|---|---|
| C02F 11/18 | (2006.01) |
| C02F 1/02 | (2006.01) |
| C02F 11/04 | (2006.01) |
| C02F 11/12 | (2006.01) |
| C02F 9/00 | (2006.01) |

(52) U.S. Cl.
CPC ................ *C02F 11/18* (2013.01); *C02F 1/025* (2013.01); *C02F 9/00* (2013.01); *C02F 11/04* (2013.01); *C02F 11/121* (2013.01); *C02F 2301/063* (2013.01); *C02F 2301/066* (2013.01); *C02F 2303/06* (2013.01)

(58) Field of Classification Search
CPC ............ C02F 1/02; C02F 1/025; C02F 11/04; C02F 11/08; C02F 11/18; C02F 11/121; C02F 2301/063; C02F 2301/066; C02F 2303/06; C02F 9/00
See application file for complete search history.

(56) References Cited

U.S. PATENT DOCUMENTS

| | | | | |
|---|---|---|---|---|
| 3,647,687 | A | * | 3/1972 | Matthiesen .................... 210/761 |
| 4,229,296 | A | * | 10/1980 | Wheaton et al. ............... 210/758 |
| 2004/0060863 | A1 | | 4/2004 | Hojsgaard et al. |
| 2006/0096163 | A1* | | 5/2006 | Dickinson et al. .............. 44/552 |
| 2009/0032464 | A1* | | 2/2009 | Noguchi et al. ............... 210/637 |
| 2009/0301974 | A1* | | 12/2009 | Belkhodja ............... C02F 11/08 210/762 |

FOREIGN PATENT DOCUMENTS

| | | |
|---|---|---|
| DE | 19811648 A1 | 9/1999 |
| DE | 10117321 A1 | 4/2002 |
| EP | 784504 B1 | 7/2000 |

(Continued)

*Primary Examiner* — Lucas Stelling
(74) *Attorney, Agent, or Firm* — Fish & Richardson P.C.

(57) ABSTRACT

The invention relates to an apparatus for thermal hydrolysis of organic matter, wherein a heating element (2) and a cooling element (4) are provisioned to heat up or cool down the organic matter. Heat exchangers are provisioned as heating element (2) and cooling element (4) which exchange heat between the organic matter and a medium. The organic matter and the medium are separate relative to each other within the heat exchangers. A throttle (9) and a decompression tank (10) are provisioned between the heating element (2) and the cooling element (4).

15 Claims, 2 Drawing Sheets

(56) References Cited

FOREIGN PATENT DOCUMENTS

Figure 1:
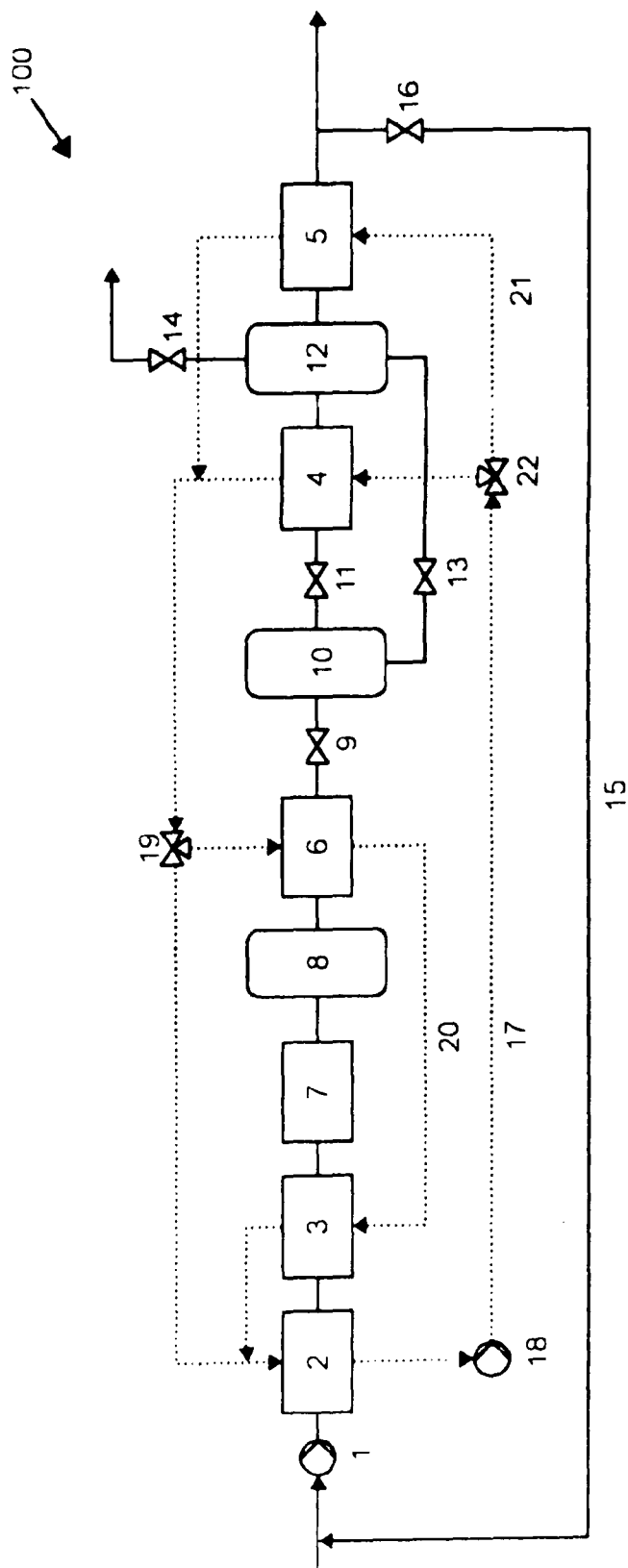

| | | | |
|---|---|---|---|
| EP | 996595 | B1 | 7/2001 |
| EP | 1198424 | B1 | 10/2004 |
| EP | 1894893 | A1 | 3/2008 |
| FR | WO 2007118867 A1 * | 10/2007 | ............ C02F 11/08 |
| WO | WO9609882 A1 | 4/1996 | |
| WO | WO9855408 A1 | 12/1998 | |
| WO | WO0073221 A1 | 12/2000 | |
| WO | WO2007117152 A1 | 10/2007 | |
| WO | WO2008026932 A1 | 3/2008 | |

* cited by examiner

APPARATUS AND METHOD FOR THERMAL HYDROLYSIS OF ORGANIC MATTER

CROSS REFERENCE TO PRIOR APPLICATIONS

This is a U.S. National Phase application under 35 U.S.C. §371 of International Patent Application No. PCT/EP2010/001886, filed Mar. 25, 2010, and claims the priority of German Patent Application No. 10 2009 014776.4, filed Mar. 25, 2009 both of which are incorporated by reference herein. The International Application published in German on Sep. 30, 2010 as WO 2010/108684 under PCT Article 21(2).

The invention relates to an apparatus for thermal hydrolysis of organic matter including at least a heating element and a cooling element which function as heat exchangers to exchange heat between the organic matter and a medium and to a method for thermal hydrolysis of organic matter.

Municipal and industrial waste water purification by means of mechanical-biological methods brings about sewage sludge. Within the past few years, quality assurance as to a high-grade water quality has led to a progressive further development of waste water or sewage treatment, as well as to an increase of connections. As a result of such progress, an increasing amount of sewage sludge especially in the industrialized countries is expected. According to the EU, there was an increase in dry sewage sludge matter of 5.5 million tons in 1992 to 8.3 million tons in 2005.

A stipulated decree for utilization aims to include, above all, to dispose of sewage sludge by a return to the cycle of materials by further utilization in agriculture or farming. However, the acceptability of such method of disposal is highly dependent on the politics of the day and varies between approval and total disapproval. Any land-filling discharge from the cycle of materials would cause destruction of both pollutants and valuable substances and is only permitted, since 2005, after sewage sludge combustion has taken place.

Owing to sludge digestion as a standard practice in biological sludge stabilization, a distinct reduction of dry sludge matter has been reached. Even against the background of a subsequently following combustion, said procedural step involves ecological and economical advantages. With regard to the utilization in agriculture, anaerobic stabilization results in a storable product with less hygienic risks. The reaction or transformation of organic substances of activated sludge is, however, generally restricted to 40 to 50% as they consist, for the most part, of slowly biodegradable organic substances.

Numerous preceding examinations have already shown that the restricting step of the anaerobic metabolic process, viz, hydrolysis of particulate matter, can be supported by targeted sewage sludge pretreatment. For example, decomposing the cell membrane causes release of intracellular material and, thus, accelerated and further stabilization. Decomposition is due to the influence of exterior forces which might either be of chemical, thermal, mechanical, or biological origin.

Permanent disposal of sewage sludge is generally preceded by temporary storage thereof. This is why sewage sludge has to be brought into a storable condition by suited stabilization methods so that negative environmental influences due to uncontrolled digestion can be excluded. In case of most municipal sewage treatment plants in Germany, sewage sludge undergoes an anaerobic treatment which is accompanied, under suitable conditions, by stabilization. In this connection, reduction of dry organic matter, improvement of dewatering, reduction of pathogens, and extraction and utilization of digester gas results as secondary effects.

Anaerobic stabilization is primarily practiced in the temperature range around 35° C. where mesophilic microorganisms have their optimum growth. Apart from this, there is another temperature optimum for thermophilic bacteria in a relatively narrow range of 48 to 55° C. Even if the latter has reached higher reaction rates, the mesophilic temperature range has been widely accepted. It is advantageous because heating can be carried out in a more energy-efficient manner and because the organisms react to temperature fluctuations in a less sensitive manner. Thermophilic digestion may be advantageous in terms of sludge hygienization but is employed just occasionally.

According to present knowledge, anaerobic degradation of organic matter takes place in four phases until it reaches end products like water, methane and carbon dioxide. During the initial hydrolysis stage, polymeric substances are split into low-molecular components by means of exoenzymes. Followed by fermentative degradation processes during the so-called acidogenesis, the monomeric and the oligomeric compounds are degraded to become reduced organic compounds (for example fatty acids, amino acids and alcohols) as well as carbon dioxide and hydrogen. A part of the resulting products (acetate, carbon dioxide, hydrogen) can directly be converted by methanogenic bacteria. The remaining fermentation products first have to be converted into acetate by acetogenic bacteria which are in close symbiosis with the methanogenic organisms. Subsequently, about 70% of the total reacted carbons are converted to methane and carbon dioxide by acetothrophic methanogenic microorganisms, while about 30% thereof are degraded by means of the direct reaction of the formed hydrogen and carbon dioxide formed as intermediates through hydrogenothropic methane generators.

The rate of the entire anaerobic digestion or degradation process of sewage sludge is limited by the first process step. The hydrolysis rate can be described as a reaction of the first order where the digestion constant is temperature-independent and can take values of about $0.25d^{-1}$ at 35° C. This sub-process will finally determine, depending on the retention time, the result of stabilization. If the retention time is reduced, digestion or decomposition of organic matter is also reduced, as substances that are difficult to be hydrolyzed can pass through the reactor in almost unchanged form. Some substances, such as facultatively anaerobic bacteria, are not attacked at all during the digestive process. However, provided it is ensured that the methanogenic bacteria can still remain and multiply in the system, the hydrolysis—which has been reduced due to the shorter retention time—merely causes a decreased gas yield. Any further retention time reduction of less than three days will, however, also stop generation of methane, as this would mean a fall-below under the generation time of methanogenic bacteria.

Sewage sludge can be crushed by means of disintegration, i.e. due to the impact of external forces to sewage sludge. Depending on the intensity of the energy input, disintegration leads to a decomposition of the flock structure of the sewage sludge up to the digestion of the microorganisms contained in the sludge. The released organic substances can be decomposed more easily through both anaerobic and aerobic decomposition. This is why disintegration is possible and reasonable at different sites of a sewage treatment plant. Especially advantageous is disintegration in case of a poorly hydrolysable sludge.

Sewage sludge can also be treated by means of thermal methods of disintegration which can be subdivided into low-thermal (temperatures below 100° C.) and high-thermal (temperatures above 100° C.) methods. Thermal disintegration methods enable that the microorganisms contained in the sludge can be decomposed effectively so as to be decomposed more easily in anaerobic and aerobic manner.

EP 1 198 424 B1 discloses a method for the continuous hydrolysis of organic matter, wherein sludge supplied for the method is mixed with flash steam from a decompression tank in a steam/sludge mixing unit. Further, sludge is conveyed from the decompression tank via a pump to a sludge/sludge heat exchanger for heating the inflowing sludge.

However, the flash steam accrues according to the selected pressure in the decompression tank. If the selected pressure is too low, the flash steam will be of a correspondingly low temperature; if the selected decompression tank pressure is higher, the result of the hydrolysis may be negatively influenced thereby. Thus, preheating by means of flash steam directly depends on the selected process conditions in the decompression tank and, thus, on the hydrolysis conditions.

Moreover, more flash steam might accrue than can actually be used during preheating. In an extreme case, this means that the raw sludge starts simmering in the preheating tank which may lead to incrustations. Due to the potential excess of flash steam, considerable amounts of energy simultaneously remain unused, thus restricting the efficiency of this process.

Apart from water steam, flash steam also contains volatile organic components and hydrolysis gas. These are supplied to the preheating tank, the volatile organic components of the flush steam being easily biodegradable. As flash steam is not immediately being discharged from the system but returned and mixed with raw sludge, the principle is violated according to which final reaction products should be discharged from the system immediately so as to maintain a maximum metabolic or conversion rate.

As sludge is mixed and heated with flash steam under just minor excess pressure, any sludge near the simmering point after preheating has to be brought to hydrolysis pressure, thus making a heat-resistant pump necessary. Pumping the sludge back to the sludge heat exchanger also requires specific pumps, thus making such recirculation relatively expensive.

Moreover, the constructive efforts for returning sludge in order to heat freshly supplied sludge is high, as the heat exchanger must be designed such that no incrustations or deposits are formed therein. Recirculation must allow for continuous and safe supply of sludge without causing any obstruction of the lines.

Such a sludge/sludge heat exchanger generally has a large pressure drop. This pressure drop will be increased if, due to specific control states, no heat has to be returned and, thus, the sludge will not be moved while being returned. Owing to the thixotropic behavior of the sludge, the viscosity of the stationary sludge further increases so that upon resumption of the heat return or recirculation a very high pressure resistance must be overcome until sludge flows again through the recirculation of the heat exchanger.

EP 1 894 893 A1 discloses a device for the treatment of organic waste, in which sludge material is treated under high temperature and pressure. In this device, a preheating container and a cooling means are provided which each comprise heating or cooling coils, respectively. Those coils are guiding a heating agent. Additionally, it is taught that steam is blown into the organic sludge.

DE 101 17 321 or EP 1 198 424 B1 teaches that in a method for treating residual biogenic material the steams arising during decompression in the decompression tank are guided to heat exchangers via circular pipelines in order to preheat residual biogenic material supplied. The condensate generated in the heat exchangers is returned to the decompression tanks via said circular pipelines. In case of this method the problem also arises that the circular pipelines have to be designed such that there will absolutely be no obstruction due to condensate components. Beyond, the thermal capacity of the steam is not very high, so that this method is relatively inefficient.

EP 1 198 424 B1 refers to a discontinuous method performed in the individual decompression tanks, as these each are closed and a certain pressure is maintained for a given period of time. Only when the decompression tanks are opened the flash steams can be returned via the circular pipeline. Consequently, said method requires several decompression tanks arranged in parallel in order to allow for an at least quasi-continuous method.

US 2004/0060863 A1 discloses a method for thermal hydrolysis of sludge, where sludge is heated in several tanks arranged in parallel by means of steam coming from another tank, respectively. This method also just refers to a quasi-continuous method, as several reactors have to be arranged in parallel.

EP 07 84 504 B1 discloses a method which makes use of a hydrolyzate out of a reaction vessel, in order to heat a hydrolyzate supplied to another reaction vessel. WO 2008/026932 A1, WO 2007/117152 A1, EP 996 595 B1 and DE 198 11 648 A1 also disclose methods for thermal hydrolysis and for the cell disintegration of organic material.

It is the object of the present invention to provide an apparatus and a method for thermal hydrolysis of organic matter by which the primary energy demands can be lowered and which method and apparatus are, at the same time, reliable, have high reaction rates and are also cost-efficient as concerns the construction and the operation thereof.

This object is solved by an apparatus for thermal hydrolysis of organic matter according to present invention and by a method for thermal hydrolysis of organic matter of the invention.

The apparatus for thermal hydrolysis of organic matter according to the present invention comprises a heating element and a cooling element to heat up or cool down the organic matter, wherein heat exchangers are provided as heating element and as cooling element, respectively, which exchange heat between the organic matter and a medium, and wherein the organic matter and the medium are separated relative to each other within said heat exchangers.

The wording used in the following, viz, that a component is provided between two other components does not exclude that still further components may be provided also between said two components.

Due to the separation of medium and organic matter within the heat exchangers so as to provide a heating and a cooling element, decoupling of the pressures between medium and organic matter can be reached on both sides the cooling side and the heating side. Hence follows that the optimally suited pressure can be adjusted in both the organic matter and the medium, in order to provide an utmost efficient method.

Furthermore, the medium can be selected independently of the organic matter in a suitable form so as to allow for a cost-effective and efficient heating and cooling of the organic matter. Beyond that, owing to the appropriate choice of the medium, there is no longer the risk of incrustations of the medium within the heat exchanger. Thus, there is more design freedom for designing the walls facing the organic matter so that incrustations can be avoided by means of an appropriate geometric design.

Due to the additional design freedom for the walls in the heat exchangers, the heat exchangers can be designed such that the through-flow of the organic matter can be improved. As the medium, in contrast to organic matter, is not thixotropic there is no clogging or obstructing of the heat exchanger, even if now and then no heat will be returned.

A hydrolysis process takes place in the organic matter, thus breaking up and making cells and cell clusters soluble so and more easily digested. Thus, a higher potential for converting the organic matter and for the stabilization of such matter can be achieved. Dissolved or hydrolyzed solid organic matter is subject to digestion more entirely than is the case for compact, undigested cells. The digestion of the cellular organic material increases with the degree of hydrolyzation so that the separately provided specialized heating and cooling elements according to the present invention allow for an exactly controlled, highly efficient hydrolysis.

According to one embodiment, the medium is a liquid advantageously being of high thermal capacity and which can be delivered easily.

Advantageously, the medium is delivered by means of a pump that delivers the medium within a circulation provided between the heating and cooling element, thus delivering heat from the cooling element to the heating element in a simple manner and supplying or discharging heat to or from the organic material in the respective heat exchangers.

Further, a throttle can functionally be provided between the heating element and the cooling element. The throttle enables a rapid decompression of organic matter by release of flash steam and hydrolysis gas. Thus, disintegration of organic matter is promoted by effecting the destruction of the cell walls of the cells present in the organic matter and by crushing larger particles. The thus treated matter can be exploited in a digester or the like, as the process of biodegradation can proceed faster. The throttle may either be formed as an orifice, a throttle valve, or in any other structural shape. In particular, the effect of the throttle may also only be obtainable by means of the pipeline for organic matter by reducing, above all, the pressure of the organic matter by widening the pipeline.

Moreover, a decompression tank can be provided after the throttle in which flash steam from the organic matter can be discharged. The required space for an efficient and abrupt decompression of the organic matter can thus be achieved.

Preferably, the decompression tank can be followed by a decompression tank valve designed to control the pressure in said decompression tank. Accordingly, the pressure in the decompression tank can be adjusted exactly such that an efficient hydrolysis with an exactly controlled passage or through-flow can be achieved.

Preferably, a hydrolysis reactor for the organic matter can functionally be provided between the heating element and the throttle. Owing to such hydrolysis reactor, the organic matter can be further heated until it reaches the desired hydrolysis temperature. The hydrolysis process can, thus, take place at ideal temperatures. The hydrolysis reactor is particularly an indirect heat exchanger through which an externally heated heating means flows that is heated in an additional heat source. Such externally heated heating means is particularly thermal oil. Alternatively, any other kind of hydrolysis reactor heating known in the art, e.g. an electric heating, may also be conceivable.

The hydrolysis reactor can functionally be followed by a storage means for storing the organic matter which is provided before the throttle and in which organic matter can be kept at hydrolysis temperature over a given period of time before decompression takes place in the throttle.

According to one embodiment, an additional cooling element for organic matter can functionally be provided between the hydrolysis reactor and the throttle. The additional cooling element is thermally coupled to the cooling element and to the heating element via an additional first branch in the circuit of the medium. Hence, it follows that heat form the still heated organic matter can effectively be returned before it cools down due to the abrupt decompression in the throttle. The energy efficiency of the apparatus is, thus, increased, as more heat can be returned and less primary energy is consumed. Owing to the additional cooling element, the decompression temperature can be set in the decompression tank irrespective of the hydrolysis temperature. This provides optimized hydrolysis results while simultaneously reducing the thermal net energy demands, i.e. thermal energy introduced from outside.

According to one embodiment, an additional heating element for organic matter can functionally be provided between the heating element and the hydrolysis reactor. The additional cooling element and the additional heating element are thermally coupled via said first additional branch in the circuit of the medium. Due to the two-stage preheating by means of the heating element and the additional heating element, a gradual heating of organic matter can be achieved so that the respective heat exchangers can exactly be dimensioned for the respective temperature range. Owing to the thermal direct coupling to the additional cooling element, a higher temperature is reached in the additional heating element than in the heating element. The heating mixing valve position has a significant influence on the thermal net energy demands for the system, thus offering the possibility to adjust the heat distribution between the hydrolysis reactor and the decompression tank optimally, depending on the parameters of the total method. This can be done via an active control while the system is running.

The flow through said first additional branch of the circuit can be controlled or adjusted via a heating mixing valve, thus providing additional possibilities for the fine adjustment of temperatures, particularly with regard to the control or adjustment of the relative temperature difference between the hydrolysis reactor and the decompression tank.

Further, a pump for organic matter can functionally be provided before the heating element. The organic matter can, thus, easily be brought to a higher pressure suited to increase the hydrolysis efficiency and to enable a high pressure drop in the throttle.

Preferably, a condensation tank for the organic matter can functionally be provided after the cooling element used to get the flash steam condensed so that the organic matter together with such condensed components can be treated further.

The still existing gaseous phase of organic matter can be discharged from the condensation tank via a condensation tank valve so that the gaseous phase and the flowable components of the organic matter can be further treated separately, thus making any further treatment more efficient than for a two-stage mixture. The condensation tank valve serves to control the pressure in the condensation tank.

The condensation tank can be followed by a condensate cooling element to further cool down the organic matter. This allows for a temperature control in the condensation tank, as both cooling before said condensation tank by means of the cooling element and cooling after said condensation tank by means of the condensate cooling element can be controlled.

Preferably, the condensate cooling element is thermally coupled to the heating element and to the cooling element via an additional second branch of the circuit of the medium, a cooling mixing valve being provided which is designed to control the distribution of the medium among the cooling element and the condensate cooling element. This arrangement allows for an efficient control of the distribution of the cooling efficiency to the cooling element and to the condensate cooling element. In general, a flow splitting in the cooling mixing valve is set to a 1:1-relation. However, depending on the temperatures as they are present in the decompression tank and as they are strived for in the condensation tank, any other split ratio of the medium can be set in the cooling mixing valve. Especially, an active control of the cooling mixing valve in dependency of the remaining method parameters can also be implemented.

Further, a decompression tank valve can be provided to discharge the gaseous phase from the decompression tank and to supply same, above all, to the condensation tank. This helps to guide the flash steam along the cooling element. This is advantageous, as a two-stage mixture in the cooling element would result in a minor cooling effect. Accordingly, this feature is suited to increase the cooling efficiency of the cooling element. Moreover, the decompression tank valve serves to control the pressure in the decompression tank.

According to one embodiment, a return pipeline for the organic matter can be provided with a return valve designed to control the throughput of the return line. Such a valve can e.g. be used to set a recirculation flow so as to control the net throughput of the plant. Further, such return line offers the possibility to perform an automatic control by pumping cleaning fluids in circulatory manner, in order to free the system from organic matter deposits.

The method for thermal hydrolysis of organic matter according to the present invention includes heating organic matter to hydrolysis temperature and then cooling it down from said hydrolysis temperature, such heating and cooling at least partially being done by means of a heat exchanger, respectively, for exchanging heat between organic matter and a medium while the organic matter and the medium are separated from each other.

Owing to such separation of the organic matter and the medium, an efficient method including the advantages of the apparatus already described above can be provided.

Furthermore, the method is characterized in that the organic matter is continuously supplied so that a high throughput and a high economic efficiency of the plant can be achieved.

Figure 2:
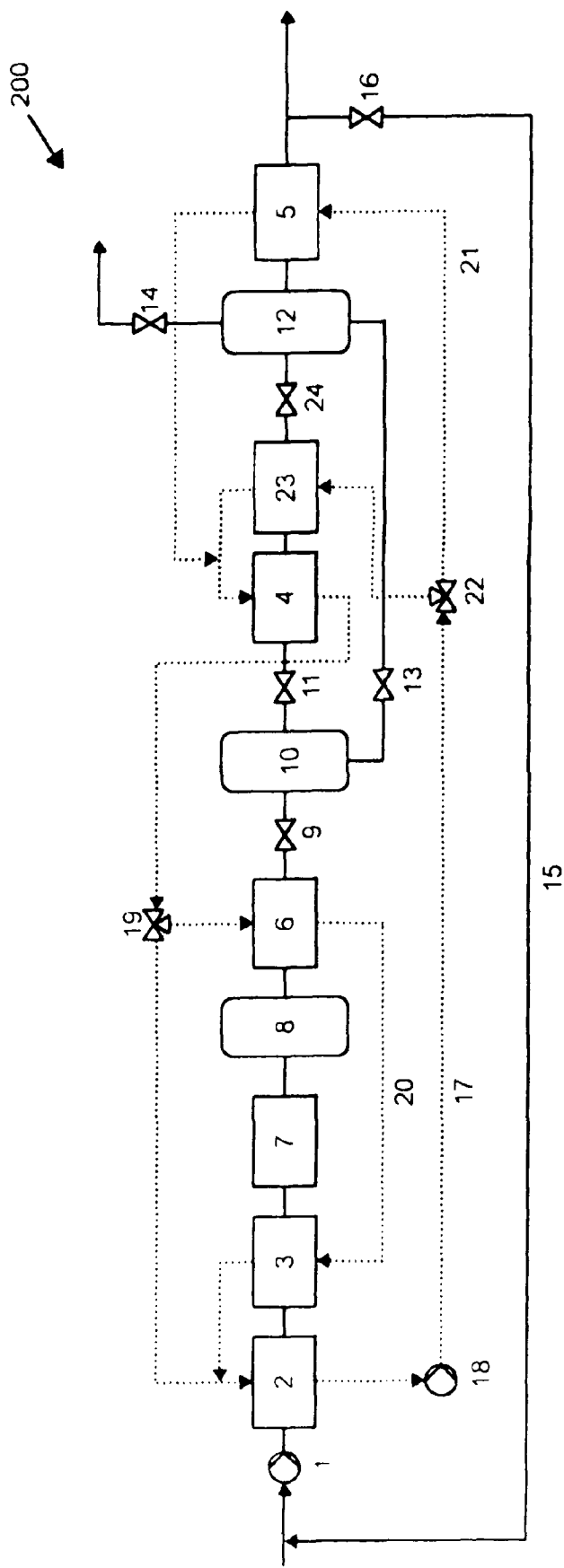

A preferred embodiment of the apparatus and of the method according to the invention will now be described with regard to the following Figures:

FIG. 1 shows an embodiment according to the invention;
FIG. 2 shows another embodiment according to the invention.

The inventive apparatus 100 schematically shown in FIG. 1 is structured as follows: A supply pipeline for organic matter, i.e. raw sludge, is connected to a high pressure pump 1. High pressure pump 1 is connected to a heating element 2 via another pipeline. Heating element 2 is an indirect heat exchanger through which a medium, here water, flows. Thus, the through-flow of heated water, here shown as dotted line, is entirely decoupled from the through-flow of organic matter, here shown as straight line. Heat is just transmitted at the boundaries of the heat exchanger.

An additional heating element 3 is connected to heating element 2 via a line, said element 3 also being formed by means of an indirect heat exchanger through which the organic matter flows, on the one hand, as well as the medium, on the other hand. The medium is heated in cooling elements 4, 5 and 6 which are all designed as indirect heat exchangers between the medium and the organic matter.

Additional heating element 3 is connected to hydrolysis reactor 7 via a line, with energy being supplied thereto from outside of the system in order to additionally heat the organic matter. Hydrolysis reactor 3 can be designed as a tubular reactor for the further heating of the organic matter by means of externally heated thermal oil. Alternatively, the hydrolysis reactor 7 can, of course, also make use of electric energy for heating the organic matter. The hydrolysis reactor is connected via a tubular pipeline to a storage means 8 of a specific volume to keep the organic matter over a given period of time so as to enable hydrolysis to proceed as much as possible. There is a high pressure and a high temperature in storage means 8.

Storage means 8 is connected via a line to an additional cooling element 6 where the organic matter is being cooled by means of the medium. Additional cooling element 6 is followed by a throttle, here designed as throttle valve 9, leading directly to a decompression tank 10. Thus, the organic matter is abruptly decompressed. Due to the rapid pressure drop, the organic matter is simmering inside, thus causing that e.g. cells are bursting in said organic matter, as the pressure inside of said cells heavily increases. Throttle valve 9 can be of the adjustable and controllable type.

A line including a decompression tank valve 11 leads from decompression tank 10 to cooling element 4. Decompression tank valve 11 is a controllable or adjustable valve and designed to optimally adjust the pressure within decompression tank 10. Alternatively, decompression tank valve 11 can also be supplemented by a frequency-controlled pump for balancing the pressure loss in the following heat exchangers.

Cooling element 4 is connected via a pipeline for the organic matter to a condensation tank 12. Alternatively, decompression tank 10 is also connected to condensation tank 12 via a decompression tank gas valve 13, in order to discharge gaseous components of the organic matter via decompression tank gas valve 13 along cooling element 4 to condensation tank 12. Condensation tank 12 is connected via a pipeline for the organic matter to condensate cooling element 5. The organic matter is guided from condensate cooling element 5 to a digestion tower (not shown). Condensation tank 12 is further provided with a condensation tank gas valve 14 for conducting gaseous components from condensation tank 12 directly to said digestion tower.

Moreover, the apparatus comprises a return pipeline 15 for the organic matter which is provided with a return valve 16. The return pipeline returns the organic matter that has already passed through the apparatus back before pump 1.

A circuit 17 is provided for the medium heating the organic matter in heating elements 2, 3 and cooling the organic matter in cooling elements 4, 5, 6, said circuit 17 consisting of lines shown in FIG. 1 by means of dotted lines. The medium is supplied via a pump 18. Within said circuit 17, a heating mixing valve 19 is provided for controlling the portion of the medium flowing through a first additional branch 20. In said first additional branch 20, the medium is heated in additional cooling element 6 by cooling the organic matter, and cooled down in additional heating element 3 by heating the organic matter. First additional branch 20 enters again into the main circuit before heating element 2.

Moreover, circuit 17 includes another additional branch 21, the proportion of the medium flowing through said second additional branch 21 being controlled by cooling mixer valve 22. Second additional branch 21 flows through condensate cooling element 5, the medium being heated therein by cooling the organic matter. Second additional branch 21 enters the main circuit again after cooling element 4.

The inventive method will now be explained with regard to FIG. 1.

First, organic matter, i.e. raw sludge, being under approximately normal temperature and normal pressure is supplied to high pressure pump 1 by which the required system pressure for thermal hydrolysis is generated. The required pressure increase is composed of the steam pressure of raw sludge at the selected hydrolysis temperature, of the pressure losses in the following heat exchangers, and of a safety margin to avoid simmering of the raw sludge at the selected hydrolysis temperature. At a selected maximum hydrolysis temperature of 170° C. and an assumed dynamic viscosity of the raw sludge of 150 mPas, there will be a steam pressure of the raw sludge at the maximum hydrolysis temperature of about 8 Bar and a pressure loss within the heat exchangers of about 6 Bar. The safety margin is set to 2 Bar. Thus, there will be a supply pressure of high pressure pump 1 for the raw sludge of at least 16 Bar.

The pressurized raw sludge will now first be preheated via heating element 2 and additional heating element 3. This will be done by making use of the waste heat gained during the re-cooling of the hydrolysate via cooling element 4, condensate cooling element 5 and additional cooling element 6. The final hydrolysis temperature is reached in hydrolysis reactor 7 designed as heat exchanger with an externally heated heating means, particularly thermal oil. The thermal oil is brought to the desired temperature by an additional heating element and then guided through hydrolysis reactor 7, with the organic matter being brought to the desired hydrolysis temperature therein.

To achieve the required hydrolysis time that distinctly differs from the hydraulic residence time in hydrolysis reactor 7, the latter is downstream followed by storage means 8 dimensioned such that the selected hydrolysis time can safely be maintained at any time. For example, the hydraulic residence time in hydrolysis reactor 7 is merely a little more than 30 seconds, whereas the overall hydrolysis time is more than 30 minutes. Storage means 8 is designed such that, on the one hand, the generated hydrolysis gas can escape and, on the other hand, any possibly settling solids may not be accumulated in storage means 8 so as to diminish the storage capacity available in an uncontrolled manner.

After having passed storage means 8 the organic matter enters into additional cooling element 6 by which the temperature of the pressurized organic matter is lowered.

Next, the organic matter passes throttle valve 9, wherein the abrupt decompression causes destruction of the cell walls of the cells present in said organic matter. Owing to the thus released energy of vaporization, the temperature of the organic matter will be correspondingly lowered.

To achieve an optimal decompression process, decompression tank 10 has been arranged directly after throttle valve 9 and provides the required space for the decompression of organic matter.

The liquid phase of organic matter is guided from decompression tank 10 via decompression tank valve 11 and cooling element 4 to condensation tank 12. The gaseous phase, however, i.e. the flash steam, is guided from decompression tank 10, by avoiding cooling element 4, via decompression tank gas valve 13 to condensation tank 12. The separation of gaseous and liquid phase of organic matter after decompression tank 10 allows for an efficient cooling within cooling element 4.

The flash steam will then be washed in condensation tank 12 with organic matter already cooled via cooling element 4 and, thus, condensed. Any remaining gaseous components in condensation tank 12 can be directly supplied via condensation tank gas valve 14 to a digestion tower (not shown). After condensation tank 12, the liquid components of the organic matter will be further cooled via condensate cooling element 5 and then supplied to the digestion tower.

In order to compensate for any discontinuously occurring initial amounts of organic matter, at least part of the organic matter can be returned via return pipeline 15 and return valve 16 so as to maintain a continuous operation of the system. Beyond, return pipeline 15 enables a cleaning fluid to be circulated through the system so that any incrustations in the system due to the organic matter can be removed.

Circuit 17 guides a heat-transferring medium, particularly water, via pump 18 through the diverse heating elements 2, 3 and cooling elements 4, 5, 6, all being designed as indirect heat exchangers. Thus, the heat of already hydrolyzed organic matter is returned to the organic matter that has not yet been hydrolyzed, to allow for an energy-efficient system requiring, compared to other systems known in the art, less thermal output supplied. Circuit 17 has been designed such that the medium does not vaporize at any point so as to enable the medium to provide for the highest possible heat transfer capacity.

Further, decoupling the medium within circuit 17 from the organic matter enables to set the pressure of the organic matter anywhere in the apparatus as required by the optimal method conditions, thus improving efficiency of hydrolysis of the organic matter.

Circuit 17 of the medium further includes heating mixing valve 19 for guiding a part of the medium into first additional branch 20, so that there is a flow-through through additional cooling element 6 and additional heating element 3. Hence it follows that the temperature of the medium is higher in said first additional branch 20 due to additional cooling element 6, such temperature being used for heating up the organic matter in additional heating element 3. Owing to additional cooling element 6 and additional heating element 3, directly being connected via first additional branch 20, the primary energy demands of the plant can be further reduced, without having effects on the hydrolysis result. To this end, the flow through first additional branch 20 is controlled by heating mixing valve 19 in accordance with the process demands.

Furthermore, circuit 17 includes second additional branch 21 for branching a part of the medium into condensate cooling element 5 provided after condensation tank 12. The amount of medium discharged into second additional branch 21 is controlled by cooling mixing valve 22. Accordingly, owing to cooling mixing valve 22, the temperature within condensation tank 12 can be controlled so as to provide for the desired conditions therein for any possible release of gases dissolved in the organic matter.

FIG. 2 shows another embodiment of the inventive apparatus 200 for thermal hydrolysis of organic matter. This embodiment substantially differs with regard to the cooling of the organic matter. Cooling element 4 is provided with a pipeline for the organic matter leading to a second cooling element 23. Second cooling element 23 is followed by a pipeline including a valve 24 to condensation tank 12. The substantial difference of this apparatus with regard to the first embodiment is in that both the main circuit 17 and the first additional branch 21 of the medium are connected to cooling element 4 so that the entire medium is supplied through said cooling element 4.

Cooling mixing valve 22 is suited to determine the proportion of the cooling of the organic matter before or after condensation tank 12. Valve 24 is designed to control the pressure or through-flow within cooling elements 4 and 23 so as to enable optimal heat exchange therein between the organic matter and the medium.

As the medium is solely used for heat transfer, an especially selected medium such as water or any other liquid of a high thermal capacity can be chosen. Further, the medium can be selected such that there are minor requirements concerning the design of neighboring boundary faces of the heat exchangers. Thus, additional design flexibility in the heat exchangers with regard to the trough-flows for the organic matter formed therein has become possible so that the trough-flows for the organic matter can be designed for large cross-sections so as to avoid critical incrustations.

Moreover, the heat exchanger faces at the side of the organic matter can be designed such that turbulences may arise thereon that are also working against the danger of incrustations, particularly by providing mechanical insets. The heat exchanger faces can be designed such that only a minor temperature difference between the medium and the heated organic matter is required to minimize local overheating that might increase the simmering tendency of organic matter. This also helps to avoid incrustations effectively.

The required process heat through hydrolysis reactor 7 can be generated externally by means of thermal oil or a steam boiler. To use thermal oil has the advantage that the boiler feed water treatment is omitted, as it is required for steam boilers. To use a steam boiler is advantageous with regard to the high thermal capacity of hot water as heating means in hydrolysis reactor 7. Hydrolysis reactor 7 can also be an indirect heat exchanger.

On the whole it can be said that not only the output of pumps 1, 18 can be controlled but that also all valves 9, 11, 13, 14, 16, 24 and distribution valves 19, 22 can be controlled separately so as to be able to influence the process parameters of the method.

The invention claimed is:

1. An apparatus for thermal hydrolysis of organic matter comprising at least one heating element and at least one cooling element to respectively heat up or cool down the organic matter, wherein a hydrolysis reactor is provided, with the organic matter being brought to a desired hydrolysis temperature therein that is equal to or below 170° C., the heating element and cooling element comprise indirect heat exchangers, respectively, which exchange heat between the organic matter and a liquid medium, further comprising a pump to supply the medium in a circuit between the heating element and the cooling element, the hydrolysis reactor for the organic matter between the heating element and a throttle, the organic matter and the medium being separated relative to each other within each of the heat exchangers, wherein the hydrolysis reactor also is an indirect heat exchanger heating the organic matter to the desired hydrolysis temperature and wherein an additional cooling element is functionally provided between the hydrolysis reactor and the throttle, and the additional cooling element is thermally coupled to the circuit of the medium via a first additional branch.

2. The apparatus according to claim 1, comprising a decompression tank after the throttle.

3. The apparatus according to claim 2, wherein the decompression tank is followed by a decompression tank valve to control the pressure within the decompression tank.

4. The apparatus according to claim 1, wherein an additional heating element for the organic matter is functionally provided between the heating element and the hydrolysis reactor, and the additional heating element is thermally coupled to the circuit of the medium via the first additional branch.

5. The apparatus according to claim 1, wherein the flow through the first additional branch can be controlled by means of a heating mixing valve.

6. The apparatus according to claim 5, wherein a pump for the organic matter is provided before the heating element.

7. The apparatus according to claim 1, wherein a condensation tank for the organic matter is functionally provided after the cooling element.

8. The apparatus according to claim 7, having a condensation tank gas valve to control the discharge of the gaseous phase of the organic matter from the condensation tank.

9. The apparatus according to claim 7, comprising a condensate cooling element after the condensation tank to cool the organic matter.

10. The apparatus according to claim 9, wherein the condensate cooling element is thermally coupled to the heating element and the cooling element via a second additional branch of the circuit of the medium, and a cooling mixing valve to control the distribution of the medium among the cooling element and the condensate cooling element.

11. An apparatus for thermal hydrolysis of organic matter comprising at least one heating element and at least one cooling element to respectively heat up or cool down the organic matter, the heating element and cooling element comprise heat exchangers which exchange heat between the organic matter and a liquid, the organic matter and the liquid being separated relative to each other within each of the heat exchangers, a throttle located between the heating element and the cooling element, a pump to supply the liquid in a circuit between the heating element and the cooling element, a hydrolysis reactor for the organic matter located between the heating element and the throttle, and wherein an additional cooling element is functionally provided between the hydrolysis reactor and the throttle, and the additional cooling element is thermally coupled to the liquid circuit via a first additional branch.

12. The apparatus according to claim 11 wherein an additional heating element for the organic matter is functionally provided between the heating element and the hydrolysis reactor, and the additional heating element is thermally coupled to the liquid circuit via the first additional branch.

13. The apparatus according to claim 11, wherein the flow through the first additional branch can be controlled by means of a heating mixing valve.

14. The apparatus according to claim 13 wherein a pump for the organic matter is provided before the heating element.

15. An apparatus for thermal hydrolysis of organic matter comprising at least one heating element and at least one cooling element to respectively heat up or cool down the organic matter, the heating element and cooling element comprise heat exchangers, which exchange heat between the organic matter and a liquid, a pump to supply the liquid in a circuit between the heating element and the cooling element, a throttle between heating element and cooling element, a condensation tank for the organic matter is functionally provided after the cooling element, a condensate cooling element after the condensation tank to cool the organic matter, the organic matter and the liquid being separated relative to each other within each of the heat exchangers, the condensate cooling element being thermally coupled to the heating element and the cooling element via a second additional branch of the liquid circuit, and a cooling mixing valve to control the distribution of the medium among the cooling element and the condensate cooling element.

\* \* \* \* \*